(12) United States Patent
Hwang et al.

(10) Patent No.: US 9,162,113 B2
(45) Date of Patent: Oct. 20, 2015

(54) GOLF BALL WITH DEGRADATION-PREVENTABLE CORE

(71) Applicant: VOLVIK INC., Eumseong-gun, Chungcheongbukdo (KR)

(72) Inventors: In Hong Hwang, Gyeonggi-do (KR); Kyung Ahn Moon, Seoul (KR)

(73) Assignee: VOLVIK INC., Eumseong-gun, Chungcheongbuk-do (KR)

( * ) Notice: Subject to any disclaimer, the term of this patent is extended or adjusted under 35 U.S.C. 154(b) by 15 days.

(21) Appl. No.: 14/102,433

(22) Filed: Dec. 10, 2013

(65) Prior Publication Data

US 2015/0065269 A1    Mar. 5, 2015

(30) Foreign Application Priority Data

Sep. 2, 2013  (KR) .......................... 10-2013-0104654

(51) Int. Cl.
*A63B 37/02* (2006.01)
*C08K 5/18* (2006.01)
*A63B 37/00* (2006.01)

(52) U.S. Cl.
CPC .............. *A63B 37/02* (2013.01); *A63B 37/0051* (2013.01); *A63B 37/0074* (2013.01); *A63B 37/0075* (2013.01); *A63B 37/0076* (2013.01); *C08K 5/18* (2013.01)

(58) Field of Classification Search
None
See application file for complete search history.

(56) References Cited

U.S. PATENT DOCUMENTS

| | | | | |
|---|---|---|---|---|
| 3,528,936 | A | * | 9/1970 | Kent et al. ...................... 524/258 |
| 3,542,692 | A | * | 11/1970 | Spacht .......................... 252/401 |
| 7,850,547 | B2 | | 12/2010 | Umezawa et al. |
| 2013/0095955 | A1 | | 4/2013 | Higuchi et al. |
| 2013/0296074 | A1 | | 11/2013 | Ozawa et al. |
| 2014/0287851 | A1 | * | 9/2014 | Bulpett et al. ................. 473/371 |
| 2015/0038264 | A1 | * | 2/2015 | Sullivan et al. ............... 473/373 |

OTHER PUBLICATIONS

Chemical Book entry for N.N'-Di-naphthyl-p-phenylenediamine; 2010.*

* cited by examiner

*Primary Examiner* — David Buttner
(74) *Attorney, Agent, or Firm* — Paratus Law Group, PLLC

(57) ABSTRACT

A golf ball has a strong durability against the hit by a golf club by preventing the degradation caused by ozone, and has the core having a good elasticity. The present invention provides a golf ball comprising a core and a cover covering the core, wherein the core compositions including a base rubber, a co-crosslinking agent, a filler, an antioxidant, a degradation preventing agent, and a cross-linking reaction initiator, wherein the degradation preventing agent which includes a substituted or unsubstituted paraphenylenediamine derivative represented by Formula 1. And, the core composition maybe comprises a micro crystalline wax with the ozone degradation preventing agent additionally, that has a strong durability against the heat, rubbing and ozone.

12 Claims, 5 Drawing Sheets

5

10

GOLF BALL WITH DEGRADATION-PREVENTABLE CORE

CROSS-REFERENCE TO RELATED APPLICATIONS

This application claims the benefit of Korean Patent Application No. 10-2013-0104654, filed on Sep. 2, 2013, in the Korean Intellectual Property Office, the disclosure of which is incorporated herein in its entirety by reference.

BACKGROUND

The present invention relates to a golf ball including a core and a cover coating the core, and more particularly, to a golf ball with a degradation-preventable core.

A golf ball includes a core formed of a material having good repulsive elasticity as a main component, and a cover protecting the core and having dimples directly involved in flight aerodynamically. The golf ball may include a single core, or may include a dual core, a triple core, etc., to attain diverse performance. Also, the golf ball has a single outermost cover having dimples thereon, however, the golf ball may have various structures, for example, including a double-layered cover in which an inner cover is formed inside an outer cover having dimples, a triple-layered cover having three covers, a quadruple-layered cover having four covers, as occasionally demands.

The core (including the dual core and the triple core, and hereinafter will be referred to as 'core') plays a key role in various golf balls. The core plays a key role in obtaining the driving distance of a golf ball by generating a strong repulsive elasticity when hitting by a golf club. For this reason, as a material for the core, cis-1,4-polybutadiene rubber (hereinafter will be referred to as 'polybutadiene rubber') having the greatest repulsive elasticity among polymer materials is widely used, and sometimes, other rubber components may be partially mixed therewith. The core is manufactured by using α,β-ethylenically unsaturated carboxylic acid, an ester of the unsaturated carboxylic acid or a metallic salt of the unsaturated carboxylic acid and an additive such as a filler for cross-linking and curing with a base rubber. The core occupies the largest volume in the golf ball and is a very important part. The core is generally distinguished from the cover protecting the core from breaking, involved in flight characteristic, and having a relatively small volume. The cover is formed by using a polymer material having a lower elasticity than the material used for the core, however having an appropriate elasticity and strong physical properties, such as an ionomer resin, polyester, a polyethylester copolymer, a thermosetting or thermoplastic polyurethane, a polyamide resin, a thermoplastic rubber, and the like.

As described above, to manufacture the core which plays the key role in the golf ball, a polybutadiene rubber or a mixture of the polybutadiene rubber and another rubber added thereto, is mixed with α,β-ethylenically unsaturated carboxylic acid, an ester of the unsaturated carboxylic acid or a metallic salt of the unsaturated carboxylic acid, which enables the polybutadiene rubber to be cross-linked and cured, and an additive such as a filler, and an organic peroxide is then added as a reaction initiator to a resultant mixture. The resultant mixture is cut into an appropriate size, and then molded, cross-linked and cured in a heat compression molding machine or a rubber injection molding machine provided with a mold having a certain shape at about 165° C. and above for about 15 minutes or more, thereby forming the core. The polybutadiene rubber generally used for making a core which is light as a specific gravity of about 0.91 g/cm$^3$, and other rubber miscible with the polybutadiene rubber is also considerably light, a heavy filler is necessary to be additionally added to control the weight of the core. When the specific gravity of the filler is low and an added amount of the filler is thus increased, the strength of the core obtained may be degraded, and the core may be easily broken when the golf ball is hit by a golf club. Of course, the decrease of the strength due to the excessive amount of the filler may be prevented by using a filler having relatively high specific gravity to some extent. However, an inhomogeneous mixture may be easily formed even due to a trivial mistake while performing a mixing process, a difference of the specific gravity be caused in the mixture, which makes it difficult to obtain a product having uniform quality. In addition, the cross-linking process is performed at an extremely high temperature using the peroxide as a reaction initiator during a molding process. Thus, the cross-linked and cured rubber becomes weak by repeated stress and is unable to maintain the strength for the desired number of hits. Particularly, the rubber becomes weaker by the hit when the core is the dual core or the triple core than the single core.

As described above, a problem caused by the molding process performed at a high temperature is degradation of the rubber which inevitably occurs as long as the core of a golf ball is produced by using the thermosetting rubber as a base material. The degradation may be reduced by various methods, however the degradation may be inevitable to some extent in a reaction system in which a side chain is developing during the cross-linking and curing reaction. Further, in the case of high stress is applied in one direction to the core during molding in one direction, crack or burst may be frequently generated in a direction perpendicular to the applied stress direction when an external impact is applied to the core taken out from the mold after finishing the molding process. In this case, the core may not be using in a product. If such a core does not found during an intermediate inspection that is applied to a finished product and released in a market, the finished product may be easily broken by a very weak hit. This leads to a user's claim.

Generally, the rubber molecules are degraded by the main chains broken due to deteriorate chemically or physically, that caused the physical properties to be lowered, or the surface of the rubber to be sticky and weakened. During chemical bonding, cross-linking may occur at the partially broken site by the attack of oxygen to an α-hydrogen site or a double bond site, and flexibility and elongation of the rubber molecule may be further decreased. Generally, natural or synthetic rubbers virtually include some chemically unsaturated bonds liable to be attacked by the oxygen, therefore, when a metal compound is included in a mixture, the degradation may proceed more rapidly around a metal compound part, because of the strong catalytic reaction of the metal compound. However, the reaction is mostly focused on the main chain during cross-linking and curing of the polybutadiene rubber having a long linear bonding, and the degradation may be considerably decreased. The molding at the high temperature is preferably finished after conducting the reaction under appropriate conditions for a certain time period. If the reaction is performed for a prolonged time period exceeding an appropriate time period, an excessively high temperature heat may be applied to the cross-liked and cured core, which accelerating the degradation of the rubber. Thus, it is necessary that the reaction time period be accurately kept and the cooling process be performed. Moreover, strong static electricity generated by the polybutadiene rubber when mixing a mixture which may allow oxygen, present in the air directly above the rubber molecules that converted into ozone. When the mixture is subjected to the cross-linking reaction with the ozone mixed therein, linear main chain of the rubber may be partially broken first to accelerate the degradation. Furthermore, later, the ozone remaining during molding may also react with an organic peroxide which is added in the mixture as a reaction initiator, and may trigger a violent reaction throughout the core when a temperature reaches a certain temperature and more. In this case, carboxyl radical may not participate in the cross-linking reaction, and may partially cleave the main chain of the rubber molecule and unsaturated carboxylic acid at an undesired site. This may accelerate degradation having certain directivity afterward. The degradation due to the ozone may not be restrained by using a general antioxidant, and the degradation of a product may not be prevented. So, a golf ball having a core preventing the above-described degradation and a strong repulsive elasticity when hitting by a golf club that has been disclosed.

SUMMARY

The present invention provides a golf ball including a core and a cover for covering the core which is prevented the degradation by ozone, and has a strong resisting force against the hit by a golf club.

Embodiments of the present invention provide a golf ball including a core and a cover covering the core. The core includes a base rubber, a co-crosslinking agent, a filler, an antioxidant, a degradation preventing agent, and a cross-linking reaction initiator, and the degradation preventing agent is a substituted or unsubstituted paraphenylenediamine derivative represented by following Formula 1:

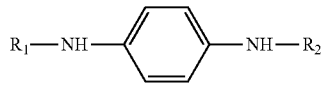

[Formula 1]

Where, $R_1$ and $R_2$ each independently represent an alkyl group or an aryl group.

In an embodiment, the base rubber may include about 60 wt % and above of a cis-1,4-polybutadiene rubber based on the base rubber.

In an embodiment, the co-crosslinking agent may be an α,β-ethylenically unsaturated carboxylic acid, an ester of the unsaturated carboxylic acid, or a metallic salt of the unsaturated carboxylic acid, or a mixture of the α,β-ethylenically unsaturated carboxylic acid, the ester of the unsaturated carboxylic acid, or the metallic salt of the unsaturated carboxylic acid with an acrylate compound or a methacrylate compound.

In an embodiment, the filler may be at least one selected from the group consisting of zinc oxide, magnesium oxide, calcium oxide, lead monoxide, trilead tetraoxide, tungsten oxide, barium sulfate, silica, calcium carbonate, clay, bismuth, tungsten, tin, aluminum, and lead.

In an embodiment, the cross-linking reaction initiator may be at least one selected from the group consisting of dicumyl peroxide, N-butyl-4,4'-bis(t-butylperoxy)valerate, bis(t-butylperoxy isopropyl)benzene, 1,1'-bis(t-butylperoxy)-3,3,5-trimethyl cyclohexane, and 2,5-di-(t-butylperoxy)-2,5-dimethylhexane.

In an embodiment, the alkyl group may include 3-9 carbon atoms.

In an embodiment, the aryl group may be a phenyl group or a naphthyl group.

In an embodiment, the degradation preventing agent may use two or more kinds of the paraphenylenediamine derivatives.

In an embodiment, the degradation preventing agent may be used in an amount of about 0.5-5 parts by weight based on 100 parts by weight of the base rubber.

In other embodiments of the present invention, a golf ball includes a core and a cover covering the core. The core includes a base rubber, a co-crosslinking agent, a filler, an antioxidant, a degradation preventing agent, and a cross-linking reaction initiator, and a substituted or unsubstituted paraphenylenediamine derivative represented by following Formula 1 and a microcrystalline wax are used together as the degradation preventing agent:

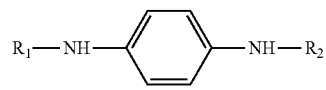

[Formula 1]

Where, $R_1$ and $R_2$ each independently represent an alkyl group or an aryl group.

In an embodiment, the microcrystalline wax may be used in an amount of about 0.5-10 parts by weight based on 100 parts by weight of the base rubber.

In an embodiment, the core may be any one selected from the group consisting of a single core, a dual core, and a triple core.

In an embodiment, the cover may be a multiple-layered cover.

According to the present invention, by manufacturing a golf ball by use of a paramethylenediamine derivative on the core for golf ball to prevent degradation caused by ozone as well as use of an antioxidant which is typically used as a general degradation preventing agent for golf balls, a golf ball having good repulsive elasticity, strong physical properties and dramatically further improved breaking strength than golf balls manufactured by using conventional cores easily affected by ozone may be provided.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE EMBODIMENTS

Figure 1:
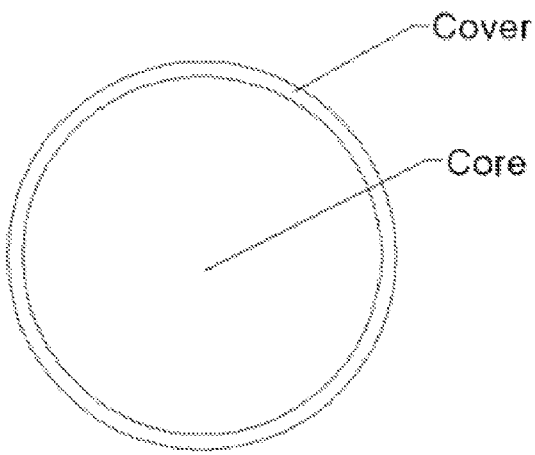
FIG. 1 is a cross-sectional view of a golf ball according to an embodiment of the present invention, which has a two-piece structure having one core and one cover.
Figure 2:
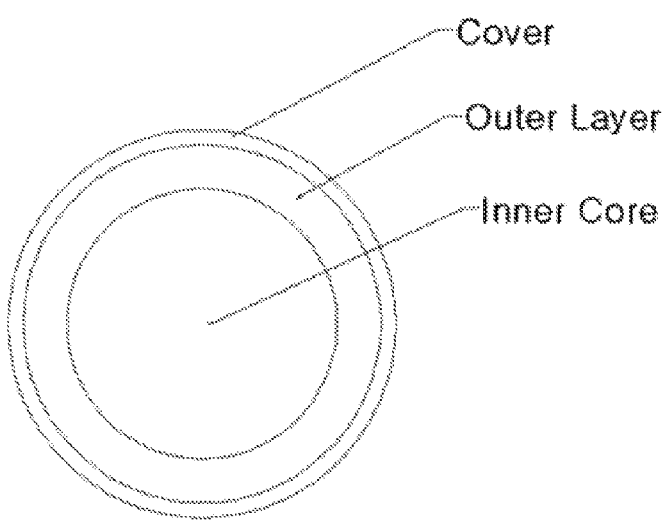
FIG. 2 is a cross-sectional view of a golf ball according to another embodiment of the present invention, which has a three-piece structure having a dual core including an inner core and an outer layer, and one cover.

Various example embodiments will be described more fully hereinafter, in which some example embodiments are shown. Unless otherwise defined, all terms used herein have the same meaning as commonly understood by one of ordinary skill in the art to which this present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The present invention may, however, be embodied in many different forms and should not be construed as limited to the example embodiments set forth herein. Rather, these example embodiments are provided so that this description will be thorough and complete, and will fully convey the scope of the present invention to those skilled in the art.

In the present invention, a golf ball comprising a core comprising a base rubber, a co-crosslinking agent, a filler, an antioxidant, a degradation preventing agent, and a cross-linking reaction initiator, and a cover covering the core is disclosed. The degradation preventing agent is a substituted or unsubstituted paraphenylenediamine derivative represented by the following Formula 1.

[Formula 1]

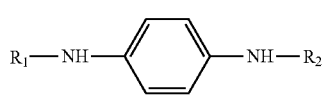

In Formula 1, $R_1$ and $R_2$ each independently represent an alkyl group or an aryl group.

Hereinafter components of the base rubber, the co-crosslinking agent, the filler, the antioxidant, and the degradation preventing agent, as basic materials for manufacturing the core used in the golf ball according to the present invention will be explained in detail.

As the base rubber, a cis-1,4-polybutadiene rubber exclusively, or a mixture obtained by mixing the cis-1,4-polybutadiene rubber with trans-1,4-polybutadiene, 1,2-polybutadiene, 3,4-polybutadiene, and the like in part may be used. According to the need, a natural rubber, an isoprene rubber, a styrene butadiene rubber, an ethylene butadiene rubber, an ethylene butadiene styrene rubber, an acrylonitrile butadiene styrene rubber, a chlorinated polyethylene rubber, and the like may be used such that they are mixed with one another, or such that they are partially mixed with the cis-1,4-polybutadiene rubber. The preferred amount of the cis-1,4-polybutadiene (hereinafter referred to as cis-compound) is about 60 wt % and above based on the total used amount of the base rubber.

The amount of the cis-compound may vary by the catalyst used in the synthesis of the polybutadiene rubber. Preferably, the polybutadiene having about 96 wt % and the above of the cis-compound may be used in the present invention. A Zeigler-Natta catalyst system may be generally used, and polybutadiene prepared by using an organic metal compound based on cobalt, nickel, neodymium, etc., as the catalyst is appropriately used in the present invention. More preferably, polybutadiene having a linear main chain containing a small amount of a branched chain and having a large weight average molecular weight (Mw) of about 200,000 and above is used. This is because a core manufactured by using the rubber containing a large amount of the cis-compound has good repulsive elasticity, and the driving distance increases in proportion to the repulsive elasticity when hitting by a golf club.

An $\alpha,\beta$-ethylenically unsaturated carboxylic acid, an ester of the unsaturated carboxylic acid, or a metallic salt of the unsaturated carboxylic acid is preferably used as the co-crosslinking agent; however, as occasionally demands, an appropriate amount of an acrylate compound or a methacrylate compound such as trimethylolpropane trimethacrylate, urethane acrylate, epoxy acrylate, and the like may be mixed with the co-crosslinking agent. In addition, a compound such as N,N'-m-phenylene dimaleimide may be used as a crosslinking assisting agent. The $\alpha,\beta$-ethylenically unsaturated carboxylic acid includes a monobasic unsaturated carboxylic acid such as acrylic acid, methacrylic acid, and the like, crotonic acid which is a homolog thereof and has a different position of a double bond, isocrotonic acid which is a stereoisomer of the crotonic acid, angelic acid, tiglic acid which is a stereoisomer of the angelic acid, and the like. In addition, dibasic unsaturated carboxylic acid such as maleic acid having a cis-structure, fumaric acid having a trans-structure, and the like may be included in the $\alpha,\beta$-ethylenically unsaturated carboxylic acid.

Also, the metallic salt of the $\alpha,\beta$-ethylenically unsaturated carboxylic acid is obtained by reacting the unsaturated carboxylic acid with a metal compound, and includes zinc acrylate, zinc methacrylate, and the like. The preferred amount of the co-crosslinking agent is about 25-45 parts by weight based on 100 parts by weight of the base rubber. If the $\alpha,\beta$-ethylenically unsaturated carboxylic acid itself is used as the co-crosslinking agent, a divalent metal compound, typically, zinc oxide is preferably mixed as a reaction active filler. The preferred amount of the zinc oxide is at least about 25 parts or more by weight based on 100 parts by weight of the base rubber. The reason to add the reaction active filler is because the unsaturated carboxylic acid is easily vaporized in a mold due to high temperature and does not participate in the cross-linking reaction, and it is thus difficult to obtain a homogeneous molded part. The role of the active filler is significant because the cross-linking reaction of the polybutadiene rubber is performed as a cross-linking reaction with an unsaturated carboxylic acid as a matrix structure state based with a metal particle of the added metal compound. However, when the unsaturated carboxylic acid is directly added for the cross-linking reaction, water produced from the reaction of the metal compound used as the filler and the carboxylic acid group of the unsaturated carboxylic acid may be vaporized in a mold due to high temperature, and a number of fine bubbles may be formed between the rubber, or the degradation of the rubber may be accelerated by the vapor of the high temperature. Therefore, the use of the metallic salt of the α,β-ethylenically unsaturated carboxylic acid or the unsaturated carboxylic acid in an ester state may be preferable.

The filler may include a metal oxide such as zinc oxide, magnesium oxide, calcium oxide, lead monoxide, trilead tetraoxide, tungsten oxide, and the like, barium sulfate, silica, calcium carbonate, clay, and the like. According to circumstances, metal powders of bismuth, tungsten, tin, aluminum, lead, and the like, or metal powders of an alloy of the metals may be used as the filler. Among the fillers above, a divalent metal compound such as zinc oxide, magnesium oxide, calcium oxide, and the like plays a significant role as the reaction active filler. This is because a portion of the metallic salt of the unsaturated carboxylic acid may easily return to the metallic salt and the unsaturated carboxylic acid during the cross-linking reaction through reversible reaction, and the produced unsaturated carboxylic acid may be vaporized and scattered. If the zinc oxide is used as the reaction active filler, the zinc oxide may play a role in capturing the vaporized and scattering unsaturated carboxylic acid. From among the divalent metal compounds as the reaction active filler, zinc oxide is most widely used, and the used amount of zinc oxide is preferably about 5-10 parts by weight based on 100 parts by weight of the base rubber. The other general fillers basically play a role in controlling the specific gravity of the core as described above, because the specific gravity of the polybutadiene rubber is very low. The used amount of the filler is preferably about 5-40 parts by weight based on 100 parts by weight of the base rubber. But, if the filler has low specific gravity, the manufactured core may be easily broken due to an excessive amount of the filler is added. On the contrary, if the filler has high specific gravity, cores having different weights may be manufactured due to inhomogeneous mixing during the mixing process.

Organic peroxides may be generally used as the cross-linking reaction initiator. From among the organic peroxides, an appropriate compound for the natural or synthetic olefin rubbers may be preferably used. Examples of the organic peroxides may include dicumyl peroxide, N-butyl-4,4'-bis(t-butylperoxy)valerate, bis(t-butylperoxy isopropyl)benzene, 1,1'-bis(t-butylperoxy)-3,3,5-trimethyl cyclohexane, 2,5-di-(t-butylperoxy)-2,5-dimethylhexane, and the like. The above-described organic peroxides are very difficult in handling and dangerous when used in a 100 wt % state. Accordingly, commercially available organic peroxides in which about 40 wt % of organic peroxide is diluted in calcium carbonate, silica, kaolin, or a mixture thereof may be used. In addition, organic peroxides diluted in an organic polymer such as polypropylene (PP), ethylene vinyl acetate (EVA), polyisobutylene, white oil, and the like may be used for specific purposes. The use of a mixture of different organic peroxides having different half-lives may be more preferable than the use of organic peroxide alone, to improve the performance of the core. The used amount of the cross-linking reaction initiator is about 2-4 parts by weight based on 100 parts by weight of the base rubber.

The degradation preventing agent may prevent the breakage of the main chain of the base rubber molecule due to excessive shear stress, heat generated by excessive mechanical friction, and the like, which may be generated during a mixing process such as a milling-mixing, or may prevent the degradation of the rubber caused by ultraviolet light, ozone, and the like. Since the mixing is performed while exposed to air, the degradation preventing agent impedes and prevents the degradation caused by the breakage of the main chain of the rubber due to oxygen in the air, strong friction between the mixtures, or heat generated by the mixture and machines, or the degradation caused by the attachment of the oxygen to the broken site first. Also, during the cross-linking reaction, the degradation preventing agent functions to prevent the main chain of the rubber or the cross-linking agent from being broken first due to free radicals activated by the organic peroxide, and functions to assist a normal cross-linking reaction. Most of the degradation preventing agents serves as an antioxidant. This is because the rubber is prone to be degraded by the excessive exposure to oxygen rather than by the exposure to light. Of course, an ultraviolet light absorbing agent may be mixed, however the antioxidant is mainly used in the present invention.

Since most of the antioxidants may also be favorably used for heat and light, the ultraviolet absorbing agent may not be separately used. The antioxidant may include dialkylated diphenylamine, 2-benzimidazol thiol, 2,2'-methylene-bis(4-methyl-6-tertiarybutylphenol), 4,4'-diphenylisopropyl dianiline, N-isopropyl-N'-phenyl-p-phenylenediamine, 2,2,4-trimethyl-1,2-dihydroquinoline, and the like. From among these, 2,2'-methylene-bis(4-methyl-6-tertiarybutylphenol) called antioxidant 2246 is most widely used. This antioxidant is preferably mixed homogeneously prior to the other components when being mixed with the rubber. The used amount of the antioxidant is preferably about 0.5-3 parts by weight based on 100 parts by weight of the base rubber.

Then, as the most essential component, an ozone degradation preventing agent or an ozone blocking agent, which is one kind of the degradation preventing agent and has similar behavior as the antioxidant, but removes generated ozone or blocks the generation of the ozone during manufacturing of the core, will be explained.

When a rubber containing a diene bond is exposed to the ozone under a stress in one direction, cracks may be generated from a perpendicular direction to the stress direction. In the following Reaction 1, the breaking of the main chain of the cis-1,4-polybutadiene rubber used in the present invention and the generation of active state oxygen are schematically illustrated.

[Reaction 1]

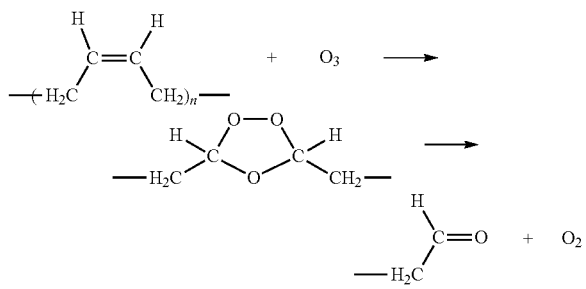

As shown in Reaction 1, the part attacked by the ozone may easily make a bond with the ozone at a double bonding site of the main chain, and the rubber molecule which is a macro molecule is partially shortened thereby, that accelerate the degradation.

The ozone is not prevented well by using a general antioxidant, however a separate ozone blocking agent is necessary. Practically, in a mixer or two roll mill used for mixing core materials used in a golf ball in quantity, a large amount of rubber and various additives are mixed to prepare a mixture for the manufacture of the core. Here, static electricity of quite high voltage may be generated according to the rate, and the static electricity of high voltage may become a considerably dangerous factor to a worker. In addition, the static electricity of high voltage may easily transform the oxygen in the air around the rubber mixture into the ozone, and the ozone may be easily mixed into the rubber mixture and remain around metal particles in the mixture. The rubber mixture including the ozone may be cut into a certain size and inserted into a mold. Then, the rubber mixture may receive pressure from the pole of an upper hemisphere mold and the pole of a lower hemisphere mold, may be pressurized toward an equator (a mold parting line: a connecting part of the upper and lower molds), and may fill up the mold. In this state, the molding at a high temperature may be performed. After a certain time period and after finishing the cross-linking and curing, the upper and lower molds are opened from the equator, and a molded part may be obtained. When the mixture is not easily released from the mold, a small external impact may be applied for easy ejection. In this case, the core may be broken in the same direction as the equator portion. The impact applied to the core is about 5-7% of the impact by which the core of a general golf ball may be broken. This phenomenon may be shown even by a small amount of the impact. This may be considered the degraded state of the cross-liked and cured rubber by ozone as described above.

The ozone degradation preventing agent used in the present invention includes paraphenylenediamine derivatives represented by the following Formula 1.

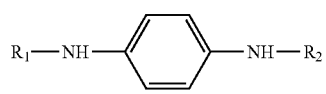

[Formula 1]

In Formula 1, $R_1$ and $R_2$ each independently represent an alkyl group or an aryl group.

The paraphenylenediamine may protect the rubber from the ozone, and may prevent the degradation caused by oxygen or heat. Particular examples of the paraphenylenediamine derivatives include a compound having the molecular structure of the above Formula 1, in which both of $R_1$ and $R_2$ are alkyl group having 3-9 carbon atoms. This paraphenylenediamine derivative has a small molecular weight, and scorch phenomenon and migration phenomenon are more serious than other paraphenylenediamines. Thus, the obtaining of a regular mixture may be difficult. Typically, diisopropyl paraphenylenediamine may be illustrated.

Other particular example of the paraphenylenediamine derivatives has a molecular structure represented by the following Formula 2.

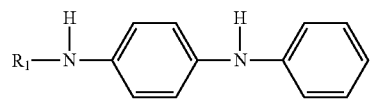

[Formula 2]

In Formula 2, $R_1$ is an alkyl group having 4-9 carbon atoms.

Typical example of the paraphenylenediamine derivative of Formula 2 may include N-1,3-dimethylbutyl-N'-phenyl-paraphenylenediamine. This compound is more stable and results in very stable scorch phenomenon than the dialkyl paraphenylenediamine, and may be preferably used in the present invention.

Another particular example of the paraphenylenediamine derivative includes diphenyl paraphenylenediamine having phenyl groups at both sides thereof, which is represented by the following Formula 3, or N,N'-di-2-naphthyl-paraphenylenediamine having naphthyl groups at both sides thereof, which is represented by the following Formula 4.

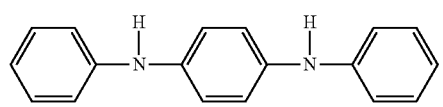

[Formula 3]

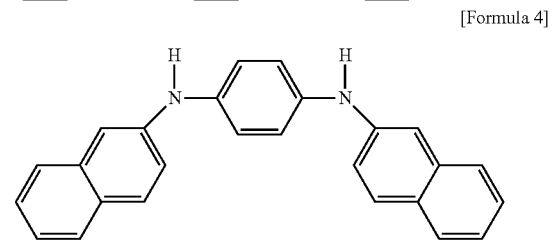

[Formula 4]

As shown in Formulae 3 and 4, the compounds having a structure including a pair of aromatic rings at both sides thereof, that have weaker ozone preventing effect than alkylaryl paraphenylenediamine of Formula 2, and tend to float upward. Accordingly, these kinds of ozone degradation preventing agents may be used by mixing with other ozone degradation preventing agent and may be used in an amount of about 0.5-5 parts by weight based on 100 parts by weight of the base rubber.

Another material having the ozone degradation preventing effect is wax. The wax tends to come out when manufacturing a product, and even after completing the product a little wax tends to gradually come out to the surface of the product. Thus, the kind, the amount, and the using method of the wax are necessary to be controlled strictly. The kind of the wax obtained during a petroleum refining process are generally used and are classified into paraffin wax including a large amount of unbranched alkanes and composed of large crystals, and microcrystalline wax including a large amount of hydrocarbons of branched isoparaffins and hydrocarbons of naphthenes, and composed of fine crystals.

Here, the microcrystalline wax includes saturated aliphatic hydrocarbons having a high molecular weight, and has dark color, high density, and high viscosity. In addition, the microcrystalline wax has high molecular weight, and high melting point due to being stickier than the paraffin wax and having high viscoelasticity. Therefore, the microcrystalline wax has good performance in adhesiveness or elasticity and is used for various purposes. The microcrystalline wax may be classified into a wax for stacking, which has a melting point of about 60-80° C., and a needle penetration index of about 25 and above as measured according to the ASTM 1321-4 test method, and a wax for curing, which has a melting point of about 80-93° C., and a needle penetration index of about 25 or less as measured according to the ASTM 1321-4 test method. The microcrystalline wax and the paraffin wax are mixed and frequently used in a rubber processing or in a tire industry. When the microcrystalline wax and the ozone degradation preventing agent are mixed and used in the present invention, the ozone degradation may be effectively prevented. The amount of the wax is preferably about 0.5-10 parts by weight, and more preferably, about 2-8 parts by weight based on 100 parts by weight of the base rubber.

Hereinafter a method of preparing compositions for the core and the cover in a golf ball and a molding method thereof according to the present invention will be described in detail.

The above-described components are mixed well to manufacture the core of the present invention by using a banbury mixer, which is an internal mixer, or a kneader. Then, the mixture is finely milled by using a two-roll mill, and the like, then formed to have an appropriate thickness in a preliminary molding machine, and cut into a certain size to perform the molding. For an appropriate mixing for the golf ball according to the present invention, the mixing process is preferably performed according to an appropriate mixing order depending on the components. The mixing may be performed by the following method in an embodiment of the present invention.

For example, the above described ozone degradation preventing agent, the wax, and the antioxidant are sequentially put into the base rubber, and a divalent metal oxide is added as the reaction active filler and well dispersed. The co-crosslinking agent suitable for the embodiment is added in a certain amount and is mixed. Thereafter, the filler is added, mixed and finely milled in a two roll mill. The temperature of the mixture is sufficiently lowered to room temperature. The temperature of the mixture is preferably lowered to the room temperature in an isolated place where a separate dehumidifier and a chiller are provided. If the mixture is used after stored for 1 hour in this state, the mixture is preferably encapsulated by covering a blocking film such as a polyethylene film for blocking ambient air so as to prevent the exposure of the ambient air. The storing time is preferably within 24 hours.

The mixture cooled down the room temperature is finely milled in a two roll mill which a chiller has been installed and operated 1 hour in advance before molding, while adding the reaction initiator little by little, then cut into an appropriate size in a preliminary molding machine, and thereafter transferred to a molding machine for molding. The molding for manufacturing an appropriate core may be performed in a mold having a pre-calculated size by using a heat compression molding machine or a rubber injection molding machine. The temperature and the pressure inside the mold during molding are significant factors and are necessary conditions for performing the cross-linking and curing reaction of the co-crosslinking agent with the rubber molecule while receiving assistance from the reaction initiator. The molding conditions for manufacturing the core preventing degradation, such as temperature, pressure, time period, and the like should be controlled strictly to perform the cross-linking and curing reaction. First, the molding begins with controlling the initial temperature of a molding machine to about 100-120° C. Afterwards, the temperature is gradually increased over about 8-10 minutes up to about 165-170° C., and then degassing is performed by removing the applied pressure once or twice. The temperature of about 165-170° C. is maintained for about 10-20 minutes while applying pressure again, and the cross-linking and curing reaction is then performed. After that, the temperature of the molding machine is gradually decreased over about 5-10 minutes, and the pressure is released. The molding machine is then opened to take out the molded core of the present invention. For the manufacture of the core appropriate for the golf ball of the present invention, about 200 tons of pressure may be preferably applied to the mold for use in manufacture of 60 cores. The core taken out from the mold is ground to an appropriate size by using a centerless grinding machine, washed, dried, and covered with a cover.

FIGS. 1 to 9 illustrate cross-sectional views of golf balls having various single-layered structures and multi-layered structures obtainable by the present invention.

As a material of an inner cover (including the inner cover, the first inner cover, the second inner cover, and a middle cover) suggested in FIGS. 3 to 9, a copolymer of ethylene or propylene with an acrylic acid, a copolymer of ethylene or propylene with methacrylic acid, a copolymer of ethylene or propylene with maleic acid, a copolymer of ethylene or propylene with itaconic acid, a reaction product of the copolymer of ethylene or propylene with an unsaturated carboxylic acid, an ionomer resin of a tri-component system obtained by partially neutralizing the precursor of the above-described copolymers using a monovalent metal such as sodium and lithium or a divalent metal such as magnesium and zinc, an ionomer resin of a tetra-component system obtained by partially esterifying the unsaturated carboxylic acid of the ionomer resin component, or an ionomer resin of a tetra-component system in which an ester molecular chain is extended lengthily through transesterification with another ester component in the ionomer resin.

The ionomer resin may be used as the inner cover after blending with a polyester ester copolymer, polyamide, ethylene butadiene ethylene, styrene butadiene styrene, and the like. In addition, a little amount of the unsaturated carboxylic acid or the metallic salt of the unsaturated carboxylic acid may be additionally added to the copolymer of the unsaturated carboxylic acid with the ethylene or the propylene. The added amount may be about 10-50 parts by weight based on 100 parts by weight of the ionomer resin. Other than the ionomer resin, polyester, an ester-ether copolymer, polyamide, polyurethane, or a mixture thereof may be appropriately mixed as the material of the inner cover. To mold the inner cover with the polymer material, a dyestuff, an organic or inorganic pigment, a filler for controlling specific gravity, and the like may be used as occasionally demands, and an anti-aging agent (including an antioxidant) may be used in part.

As a molding method for the inner cover, an injection molding method or an compression molding method may be used. A large amount of unnecessary gas may be generated during molding when using the synthetic resin materials among the materials for the inner cover, and bubbles may be present between layers after molding, or the shape of the molded part may be frequently collapsed. In this case, the adhesiveness between layers may become weak, physical properties may be lowered, or the appearance may be unsatisfactory. Therefore, the mixture used for the inner cover may be mixed in an extruder at the barrel temperature of about 230° C. and above for several minutes or more while being rotated using a screw, and a large amount of generated unnecessary gas is discharged at an appropriate position by using a vacuum pump. After discharging the gas sufficiently, a pellet is manufactured, and this pellet is vacuum dried at an appropriate temperature and molded into the inner cover.

The material of the outermost cover of the present invention may include the ionomer resin, polyester, an ester-ether copolymer, polyamide, polyurethane, an ethylene butadiene styrene copolymer, an ethylene propylene diene polymer, an ethylene propylene maleic acid copolymer, and the like, or a mixture thereof at appropriate ratios. Preferably, the ionomer resin or polyurethane may be used. For the ionomer resin, the material used for the inner cover may also be used for the cover. For obtaining vivid color, it is advantageous to select the ionomer resin having a large amount of an unsaturated carboxylic acid and good transparency. The cover may be generally manufactured through an injection molding or a compression molding when the ionomer resin is used.

Meanwhile, polyurethane may be a cover material showing various physical properties according to the kind of diol for preparing polyol or the kind of diisocyanate for preparing polyisocyanate, and therefore is widely used for the cover of a golf ball. The polyurethane is a polymer containing an urethane group obtained through the bonding of the polyol containing an active hydrogen atom, e.g., a hydroxyl group, with the diisocyanate or the polyisocyanate. The polyurethane is obtained from an isocyanate (—NCO), and is also called an isocyanate polymer. Generally, other bonding groups other than the urethane bonding, such as ether, ester, urea, amide, allophanate, biuret (allophanamide), and the like are present in the molecule, and the polyurethane may be abbreviated as 'PU' or 'PUR'.

Since PU has various types of raw materials and polymerization methods, PU may be formed into various kinds of products and uses of PU are also diverse. The raw material for a PU appropriate for the cover of a golf ball according to the present invention may include a number of components, for example, diisocyanate components such as 2,4-toluene diisocyanate (2,4-TDI), 2,6-toluenediisocyanate (2,6-TDI), diphenylmethane-4,4'-diisocyanate (4,4'-MDI), diphenylmethane-2,4-diisocyanate (2,4-MDI), diphenylmethane-2,2'-diisocyanate (2,2'-MDI), 1,6-hexamethylenediisocyanate (1,6-HDI), 2,2,4(2,4,4)-trimethyl hexamethylene diisocyanate (2,2,4(2,4,4)-TMDI), p-phenylene diisocyanate (PPDI), 4,4'-dicyclohexyl methane diisocyanate (HMDI), m-xylene diisocyanate (XDI), isophorone diisocyanate (IPDI), 1,5-naphthalene diisocyanate (NDI), trans-1,4-cyclohexyl diisocyanate (CHDI), and the like. These compounds may be used alone or as a mixture thereof. Particularly, the mixture may be prepared considering physical properties, transparency, light-induced discoloration resistance, and considerably desirable results may be obtained when using the mixture.

From among the above-described various diisocyanates used for the cover of the present invention, toluene diisocyanate (TDI) is preferable. TDI may be classified into 2,4-TDI and 2,6-TDI depending on the molecular structure. Although any combination may be used, a mixture of 2,4-TDI and 2,6-TDI at about 80:20 may be used alone, or may also be mixed and used with other diisocyanate. The diisocyanate miscible with the TDI includes 1,6-HDI, XDI, IPDI, NDI, 2,2,4(2,4,4)-TMDI, CHDI, and the like. One of these compounds may be mixed with the TDI.

When a mixture of two or more kinds of the diisocyanates is used for the manufacture of the PU for cover according to the present invention, a modification process is preferably performed in advance to ensure reaction control and chain extension. As modified compounds obtained by the modification process, there may be a carbodiimidized modified diisocyanate which is obtained by reacting two or more kinds of the diisocyanates by using an appropriate catalyst at about 100° C. for about 2-3 hours, and an urethane modified diisocyanate which is obtained by reacting two or more kinds of the diisocyanates with a low molecular weight polyether chain or polyester chain in advance to leave —NCO groups at both terminals.

Meanwhile, another raw material to be reacted with the diisocyanate is a polyol. A starting material for preparing the polyol is a compound having at least two hydroxyl groups (—OH) in a molecule and may include a compound containing two functional groups such as ethylene glycol, propylene glycol, diethylene glycol, dipropylene glycol, and the like, a compound containing three functional groups such as glycerin, trimethylolpropane, 1,2,6-hexanetriol, and the like, and a hydroxyl compound containing four functional groups. Based on the starting material, the polyol may be prepared by extension the molecular chain. Polyether polyol may be prepared by adding an epoxide such as propylene oxide, ethylene oxide, 1,2- or 2,3-butylene oxide, and the like, and having a average molecular weight of about 1,000-6,000 may be used as a important polyol. The polyether polyol may be prepared by block polymerizing a plurality of epoxides, or by using a different mixture from the starting material. The antioxidant made of a phenol derivative is preferably used for the polyether polyol.

Besides, a polyether synthesized without addition of the epoxide may also be used. The PU obtained by using the polyether has weaker physical properties than the PU obtained by using polyester. However, the polyether type PU is much more excellent in durability such as hydrolysis resistance than the polyester type PU.

The polyether type polytetramethylene ether glycol (PTMEG) widely used as a material for the cover is a polyol of a linear glycol having —OH groups at both terminals thereof, and includes two kinds having a weight average molecular weight of 1,000 and 2,000. The PTMEG is a important polyol as the PU cover of the golf ball according to the present invention. When a copolymer is manufactured by block polymerizing the PTMEG with polyethylene terephthalate (PET), polybutylene terephthalate (PBT), and the like, a polyether ester copolymer may be derived and used for the manufacture of the inner cover. When the PTMEG is used alone as the polyol, the mixing properties of the obtained PU and the other PU resin is not so good, thus pay attention to use.

The polyester polyol containing the —OH groups at both terminal thereof, which is an important raw material as the polyol, obtained by the polymerization condensation of polyfunctional carbonic acid and polyfunctional hydroxyl compound, the polymerization condensation of hydroxylcarbonic acid, the polymerization of cyclic ester (lactone), the reaction between an acid chloride with an alkaline salt of a hydroxyl compound, the polyaddition reaction of an epoxide into anhydrous polycarbonate, a transesterification reaction, and the like.

Here, generally and widely used polyester polyol may be mostly obtained through an ester bonding of a dibasic acid and a diol. To obtain the polyester polyol containing a large number of branches, polyalcohol may be desirably used. The kind of the dibasic acid includes adipic acid, phthalic acid, succinic acid, azelaic acid, cebasic acid, ricinoleic acid, and the like. The diol includes ethylene glycol, propylene glycol, butandiol, hexanediol, neopentyl glycol, diethylene glycol, triethylene glycol, pentanediol, cyclohexanedimethanol, and the like. The polyalcohol includes glycerin, trimethylolpropane, trimethylolethane, pentaerythritol, and the like. Generally, a polyester is prepared from a dibasic acid and a diol represented by glycol, and a polyol containing the —OH groups at both terminal is prepared by adding a chain extender. Since the obtained polyester has bad hydrolysis resistance, a hydrolysis-resistant stabilizer such as carbodiimide and polycarbodiimide may be added. Various defects may be generated in the polyester due to a residual acid. The acid reacts with the diisocyanate and emits carbonic acid gas to produce an amide. The amide reacts with the diisocyanate again to produce an acyl urea. The acyl urea may deteriorate the reactivity of urethane production during PU reaction and may deteriorate the hydrolysis resistance.

The chain extender is a reactive mono molecule or a molecule similar to the mono molecule used to extend the molecular weight during polymerization and to strengthen the bonding between molecules. The chain extender includes a difunctional material such as a diol and a diamine, wherein examples of the diol may include ethylene glycol, diethylene glycol, propylene glycol, dipropylene glycol, and 1,4-butanediol, and examples of the diamine may include ethylenediamine, hexamethylenediamine, 4,4'-diaminodiphenylmethane, m-phenylenediamine, 3,3'-dichloro-4,4'-diaminodiphenylmethane (MOCA), and hydrazine. The cross-linking agent may also be included in the chain extender. A triol such as glycerin and trimethylolpropane, a tetraol such as oxypropylated ethylenediamine, oxypropylated or oxyethylated ethylenediamine, and pentaerythritol, and a polyamine may be used as a polyfunctional cross-linking agent, or a branching agent.

Polycaprolactone polyol having a weight average molecular weight of about 550-4,000 is obtained by a cyclic ester polymerization of epsilon caprolactone with a hydroxyl compound. The polycaprolactone polyol has improved physical properties at low temperature, low viscosity, and the like.

As another important polyester polyol for the cover material of the golf ball according to the present invention, a polycarbonate polyol is a linear chain type of aliphatic or alicyclic diol having a high strength, high resistance to ultraviolet light and oxygen, and good hydrolysis resistance.

As methods of manufacturing a polyurethane cover appropriate in the present invention by using the polyol or diisocyanate described above, the following two methods may be used. According to one method, a thermosetting polyurethane cover of a reaction injection molding or a casting molding made from an urethane prepolymer having isocyanate groups at both terminals and a liquid phase polyol or a polyamine as a curing agent that is well mixed and immediately inserted into a mold and heating the mold for reaction and solidification. According to another method, a thermoplastic polyurethane cover may be manufactured. Polyol and polyisocyanate or isocyanate are reacted in advance with appropriate equivalent weights to produce thermoplastic polyurethane. The produced resin is heated and melted by an appropriate method such as injection, then molded in a mold, and cooled. According to the former method, a raw material having a short molecular chain is used, and thus the molecular weight of the cover may be decreased. In addition, the used amount of the cross-linking agent is large, so the yellowing phenomena may easily occur, and a color coating agent must be separately coated. According to the latter method, polyurethane having a high molecular weight is used as the raw material, the molecular weight of the cover material may be large and long. In addition, yellowing may not be generated or may be suppressed.

Meanwhile, the strength or durability of the thermoplastic polyurethane may also be reinforced by mixing a polycarbonate resin, a tri-block copolymer such as styrene butadiene styrene, and the like in part as disclosed in Korean Registered Patent Publication No. 0134652. The amount added may be about 10-40 parts by weight based on 100 parts by weight of a main component, the polyurethane. Various kinds of cover molding methods are known, which include, for example, a RIM method for manufacturing a molded part by mixing and reacting a polyol and a polyisocyanate just before molding, a casting method, a method of manufacturing a cover by forming a thermoplastic polyurethane in advance and then injection molding or compression molding, or a method of forming a polyurethane sheet and then compressing, melting, and molding the polyurethane sheet using an appropriate molding machine.

In the cover material, an appropriate amount of an organic, an inorganic, a fluorescent pigment or a dyestuff, an anti-aging agent, a weight controlling agent, and the like may be added. Alternatively, a master batch may be prepared in advance and mixed with a resin. The amount of the additive used in the cover material except for the resin is preferably less than or equal to about 3 parts by weight based on 100 parts by weight of the resin. Because the cover may have lower physical strength or may be easily broken when a large amount of the additive such as the pigment is mixed into the main material of the polymer material such as the ionomer, the polyurethane, and the like.

The core manufactured by the method of the present invention was tested in a C.O.R. testing machine (Automated Design Corporation Co.) installed with a barrel of #5 at the velocity of 125±2 ft/sec, and the test result showed good repulsive elasticity of about 0.805-0.81. When a golf ball manufactured by covering the core with an ionomer cover was tested in the C.O.R. tester installed with a barrel of #3 at the velocity of 125±2 ft/sec, the golf ball had excellent repulsive elasticity of about 0.817-0.827. In addition, a breaking test was performed on the same golf ball at the velocity of 175±2 ft/sec, and the result showed that the golf ball was not broken when repeated about 150-250 times. From the result, it was verified that the golf ball was rarely broken and showed good degradation preventing effect.

Hereinafter, the present invention will be described in more detail referring to examples. Various kinds of the golf balls according to the present invention may be manufactured as illustrated in the drawings. However, in these examples, the structures in FIGS. 3 and 4 were manufactured as typical structures easily available from the market. Since the covers for other golf balls of the same structure including a single or dual core and illustrated in other drawings may be manufactured by using similar components, therefore the other examples are not further described below but may be considered similar to the examples as described. Also, the triple core may differ in its basic structure and performance from the single or dual core, however, may be manufactured in a manner similar to that of the dual core, and have a breaking strength similar to that of the dual core. Therefore, an example therefor will not be described below.

Example 1 and Comparative Example 1

Cis-1,4-polybutadiene (rubber Mooney viscosity: 40), cis-1,4-polybutadiene (rubber Mooney viscosity: 60), zinc diacrylate (co-crosslinking agent), zinc oxide (active filler), minium (filler, pigment), 2,2'-methylene-bis(4-methyl-6-tertiarybutylphenol) (antioxidant), N-1,3-dimethylbutyl-N'-phenyl-paraphenylenediamine (ozone degradation preventing agent of alkylaryl paraphenylenediamines), microcrystalline wax (ozone preventing assisting agent of curing degree), etc., were mixed in amounts illustrated in the following Table 1 in a kneader for about 30 minutes. The mixture was cooled to room temperature sufficiently in an isolated cooling box equipped with a separate dehumidifier and a chiller for lowering the temperature of the mixture to room temperature. The mixture cooled down the temperature and milled in a two roll mill equipped with a chiller while adding dicumyl peroxide (40% cross-linking reaction initiator) in an amount illustrated in the following Table 1 little by little, then cut into an appropriate size in a preliminary molding machine, and transferred to the heat compression molding machine for molding. The mold mounted to the compression molding machine includes 60 molding cavities. The cut mixtures having the appropriate size were put into the cavities. The molding was started with the initial temperature of the molding machine of about 100-105° C. and the pressure of about 200 tons, and the temperature was gradually increased over 8 minutes to about 165-170° C. The applied pressure was removed once or twice and degassing was performed, and the pressure was applied again. The temperature of about 165-170° C. was maintained for about 20 minutes, and the cross-linking and curing reaction was performed. Then, the temperature of the molding machine was gradually decreased for about 7 minutes, and the pressure was released. The mold was opened and a molded core appropriate for the present invention was taken out. The taken-out core was cooled to room temperature, ground in a centerless grinder to an appropriate size, washed, dried, and cooled in a dehumidified place to obtain a core appropriate for the present invention.

Then, the core was covered with an inner cover. As the material of the inner cover, Surlyn 8940 (Dupont Co., ionomer of sodium ion), Surlyn 9910 (Dupont Co., ionomer of zinc ion), titanium oxide, etc., were mixed in amounts illustrated in the following Table 1 to obtain a master batch. The master batch was dried and injection molded to the mold including the manufactured core by using an injection molding machine in advance. From the injection molded half-finished product covered with the inner cover, a gate was cut, and grinding, washing, drying, and cooling to room temperature were performed.

Figure 4:
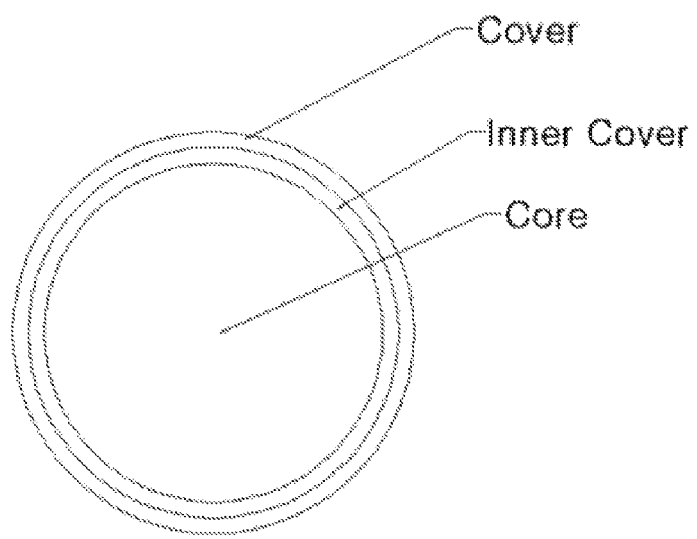
FIG. 4 is a cross-sectional view of a golf ball according to an embodiment of the present invention, which has a two-piece structure having one core and a double-layered cover including an inner cover and a cover.
Figure 5:
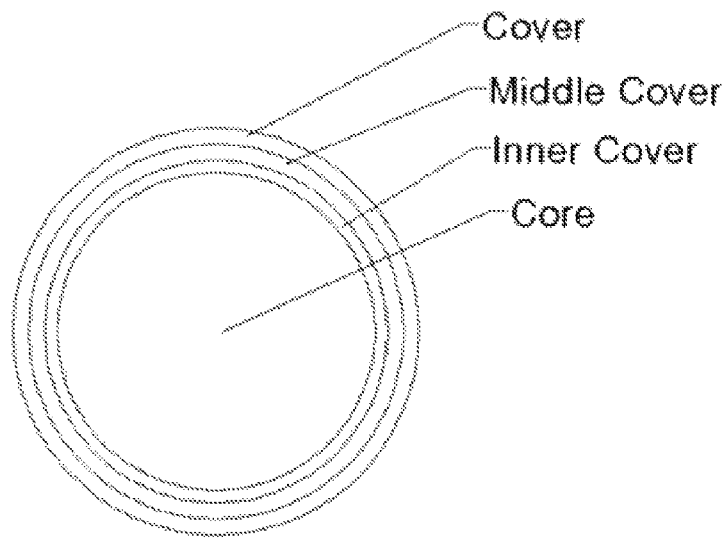
FIG. 5 is a cross-sectional view of a golf ball according to an embodiment of the present invention, which has a four-piece structure having one core and a triple-layered cover including an inner cover, a middle cover and a cover.
Figure 6:
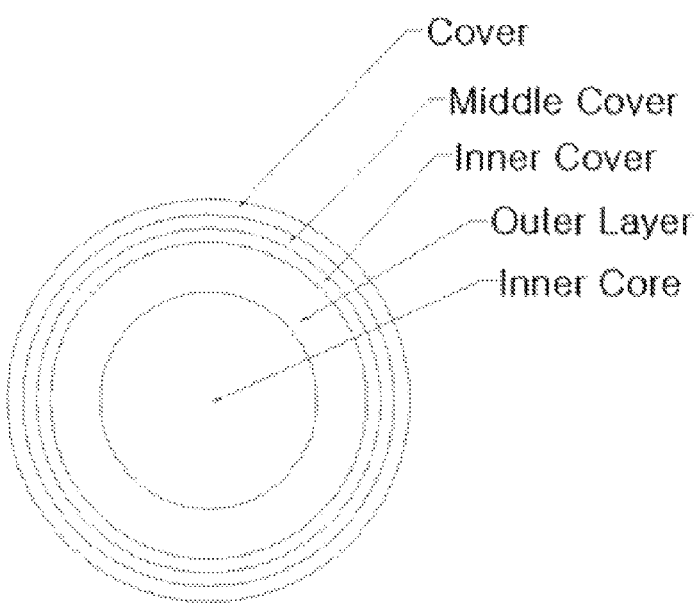
FIG. 6 is a cross-sectional view of a golf ball according to an embodiment of the present invention, which has a five-piece structure having a dual core including an inner core and an outer layer, and a triple-layered cover including an inner cover, a middle cover and a cover.
Figure 7:
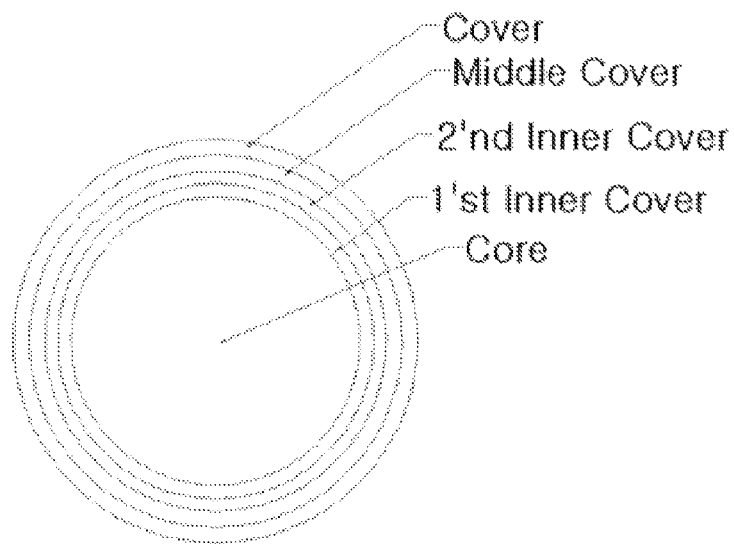
FIG. 7 is a cross-sectional view of a golf ball according to an embodiment of the present invention, which has a five-piece structure having one core, and a quadruple-layered cover including a first inner cover, a second inner cover, a middle cover and a cover.
Figure 8:
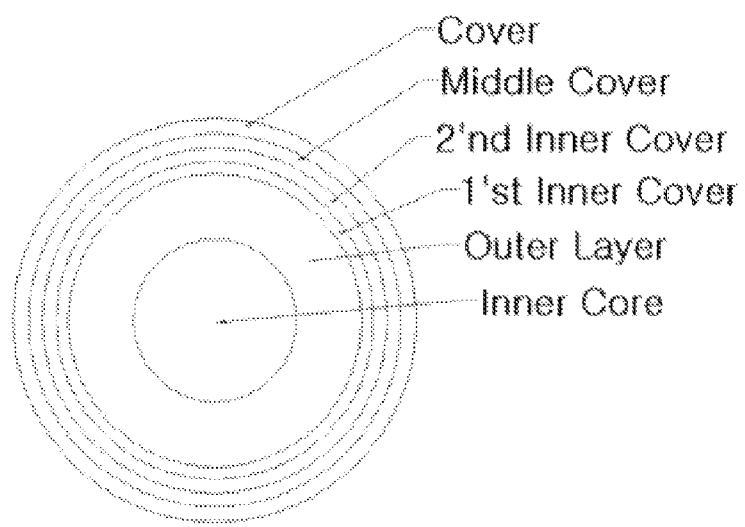
FIG. 8 is a cross-sectional view of a golf ball according to an embodiment of the present invention, which has a six-piece structure having a dual core including an inner core and an outer layer, and a quadruple-layered cover including a first inner cover, a second inner cover, a middle cover and a cover.
Figure 9:
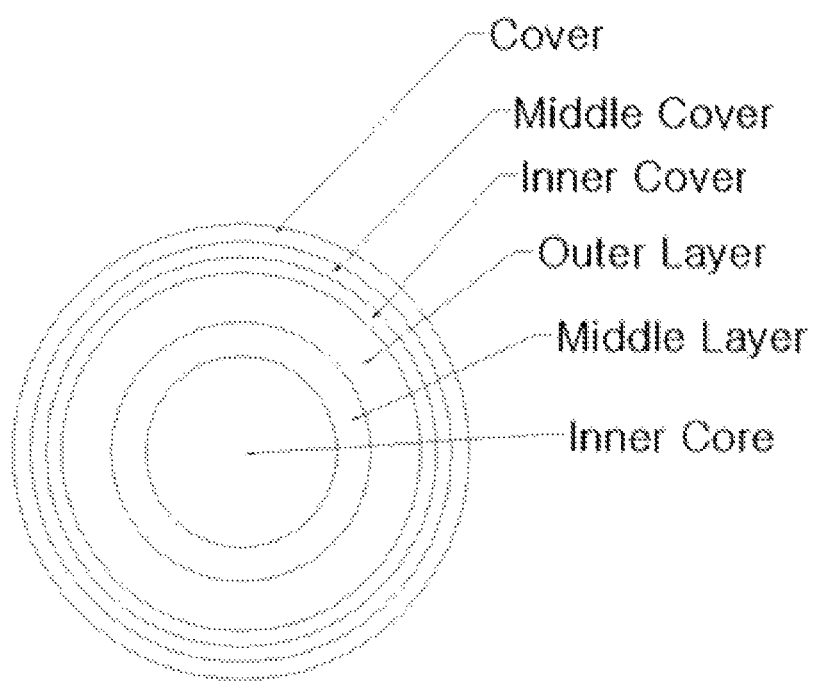
FIG. 9 is a cross-sectional view of a golf ball according to an embodiment of the present invention, which has a six-piece structure having a triple core including an inner core, a middle layer, and an outer layer, and a triple-layered cover including an inner cover, a middle cover and a cover.

A master batch was prepared by mixing polyurethane resin Pandex T-R3080 (DIC Bayer Polymer Co., non-yellowing type polyurethane), Des795 (DIC Bayer Polymer Co., carbonate type polyurethane), Cariflex TR-1102 (Shell Co., styrene butadiene styrene type triblock copolymer), Trirex 3022 IR (Samyang Co., aromatic polycarbonate), titanium oxide, Irganox 1010 (Ciba Specialty Chemicals Co., phenolic anti-oxidant), Cyasolve UV-5411 (Cytec Industries Co., phenolic ultraviolet light absorbing agent), etc. in an amount illustrated in the following Table 1. The master batch was formed into a pellet and dried. The dried cover mixture pellet was molded in a mold equipped with a temperature controlling bath mounted an injection molding machine, on the half-finished product covered with an inner cover so as to manufacture a cover. A buffing process was performed to buff the mold commissure of the cover, and followed by washing and drying. And then, logo was marked, and a two-component type polyurethane was coated, and drying using hot air, and aging were performed to manufacture a three-piece golf ball having a diameter of about 42.7-42.75 mm, a weight of about 45.3-45.7 g, a single core, and a double-layered cover, as illustrated in FIG. 4 (Example 1).

Meanwhile, a golf ball compared to Example 1, including a core having the conventional constituents and having the same size and weight as the three piece golf ball having a double-layered cover according to Example 1, was manufactured (Comparative Example 1). 24 cores manufactured according to Example 1 were tested in a C.O.R. tester manufactured by Automated Design Corporation Co. equipped with a barrel of #5 at the velocity of 125±2 ft/sec, to measure C.O.R. Similarly, the C.O.R. of 24 cores according to Comparative Example 1 was measured. Average values of each result were computed and illustrated in the following Table 1. Each of the golf balls with covers were tested on the C.O.R. tester with a barrel #3 at the velocity of 125±2 ft/sec, and the results are illustrated in the following Table 1. In addition, a breaking test was performed with 6 golf balls individually at the velocity of 175±2 ft/sec and calculated by number until crack was generated. The results are illustrated in the following Table 1 for comparison.

TABLE 1

| | | Example 1 | Comparative Example 1 |
|---|---|---|---|
| Mixing ingredient | Core composition (parts by weight) | | |
| | Cis-1,4-polybutadiene (Mooney viscosity 40) | 50 | 50 |
| | Cis-1,4-polybutadiene (Mooney viscosity 60) | 50 | 50 |
| | Zinc Diacrylate | 30 | 30 |
| | Zinc oxide | 5.5 | 5.5 |
| | Minium | 2 | 2 |
| | 2,2'-methylene-bis(4-methyl-6-tertiarybutylphenol) | 0.5 | 0.5 |
| | N-1,3-dimethylbutyl-N-phenyl-paraphenylenediamine | 1 | 0 |
| | Microcrystalline wax (for curing degree) | 2 | 0 |
| | Dicumyl peroxide (40%) | 3.5 | 3 |
| | Inner cover composition (parts by weight) | | |
| | Surlyn 8940 | 50 | 50 |
| | Surlyn 9910 | 50 | 50 |
| | Titanium oxide | 3 | 3 |
| | Cover composition (parts by weight) | | |
| | Pandex T-R3080 | 40 | 40 |
| | Des795 | 35 | 35 |
| | Cariflex TR-1102 | 15 | 15 |
| | Trirex 3022 IR | 10 | 10 |
| | Titanium oxide | 3 | 3 |
| | Irganox 1010 | 0.15 | 0.15 |
| | Cyasolve UV-5411 | 0.15 | 0.15 |
| C.O.R. | Test method | | |
| | Core (barrel #5, velocity 125 ± 2 ft/sec) | 0.8078 | 0.8034 |
| | Golf ball (barrel #3, velocity 125 ± 2 ft/sec) | 0.8179 | 0.8109 |

TABLE 1-continued

| | | Example 1 | Comparative Example 1 |
|---|---|---|---|
| Breaking strength (number) | Golf ball (barrel #3, velocity 175 ± 2 ft/sec) | 122.7 | 72.3 |

Example 2 and Comparative Example 2

Cis-1,4-polybutadiene (rubber Mooney viscosity: 40), cis-1,4-polybutadiene (rubber Mooney viscosity: 60), zinc diacrylate (co-crosslinking agent), zinc oxide (active filler), minium (filler, pigment), 2,2'-methylene-bis(4-methyl-6-tertiarybutylphenol) (antioxidant), N-1,3-dimethylbutyl-N'-phenyl-paraphenylenediamine (ozone degradation preventing agent of alkylaryl paraphenylenediamines), diphenyl paraphenylenediamine (ozone degradation preventing agent of diaryl paraphenylenediamines), microcrystalline wax (ozone preventing assisting agent of curing degree), etc. were mixed by an amount illustrated in the following Table 2 in a kneader for about 30 minutes. The mixture was sufficiently cooled down the temperature in an isolated cooling box equipped with a separate dehumidifier and a chiller for lowering the temperature of the mixture to room temperature. The mixture cooled to room temperature was milled in a two-roll mill equipped with a chiller while adding dicumyl peroxide bis(t-butylperoxy isopropyl)benzene (40% cross-linking reaction initiator) and 1,1'-bis(t-butylperoxy)-3,3,5-trimethyl cyclohexane (40% cross-linking reaction initiator) in an amount illustrated in the following Table 2 little by little, cut into an appropriate size by using a preliminary molding machine, and sent to a compression molding machine for molding. The mold mounted to the compression molding machine includes 70 cavities. The mixture cut into an appropriate size for the mold cavities for making the inner core. The molding was initiated with the initial temperature of the molding machine of about 100-105° C. and the pressure of about 200 tons, and the temperature was gradually increased for about 8 minutes to about 165-170° C. The applied pressure was removed for once or twice and degassing was performed, and the pressure was applied again. The temperature of about 165-170° C. was maintained for about 15 minutes, and the cross-linking and curing reaction was performed. Then, the temperature of the molding machine was gradually decreased for about 5 minutes, and the pressure was released. The mold was opened and a molded core according to the present invention was taken out. The core was cooled to room temperature, and grinding in a centerless grinder to an appropriate size, and washing, drying, and cooling in a dehumidified place were performed to obtain an inner core according to the present invention.

Then, a hemisphere was manufactured using an outer layer composition of the dual core illustrated in the following Table 2, by pre-molding at about 100-105° C. for 10 minutes in a compression molding machine equipped with a mold having a hemisphere type cavity. The inner core was covered with the hemisphere, and the molding was initiated with the initial temperature of the molding machine of about 100-105° C. and the pressure of about 200 tons, and the temperature was gradually increased for about 8 minutes to about 165-170° C. The applied pressure was removed for once or twice and degassing was performed, and the pressure was applied again. The temperature of about 165-170° C. was maintained for about 10 minutes, and the cross-linking and curing reaction was performed. Then, the temperature of the molding machine was gradually decreased for about 5 minutes, and the pressure was released. The mold was opened and a molded dual core according to the present invention was taken out. The dual core was cooled to room temperature, and grinding in a centerless grinder to an appropriate size, and washing, drying, and cooling in a dehumidified place were performed to obtain a dual core according to the present invention.

Then, the dual core was covered with an inner cover. As the material of the inner cover, HPF 2000 (Dupont Co., ionomer of a magnesium ion), Surlyn 8940 (Dupont Co., ionomer of a sodium ion), Surlyn 9910 (Dupont Co., ionomer of a zinc ion), titanium oxide, etc. were mixed in an amount illustrated in the following Table 2 to obtain a master batch. The master batch was dried and injection molded on the manufactured core by using an injection molding machine in advance. The half-finished product covered with the inner cover, a gate was cut, and grinding, washing, drying, and cooling to room temperature were performed.

Figure 3:
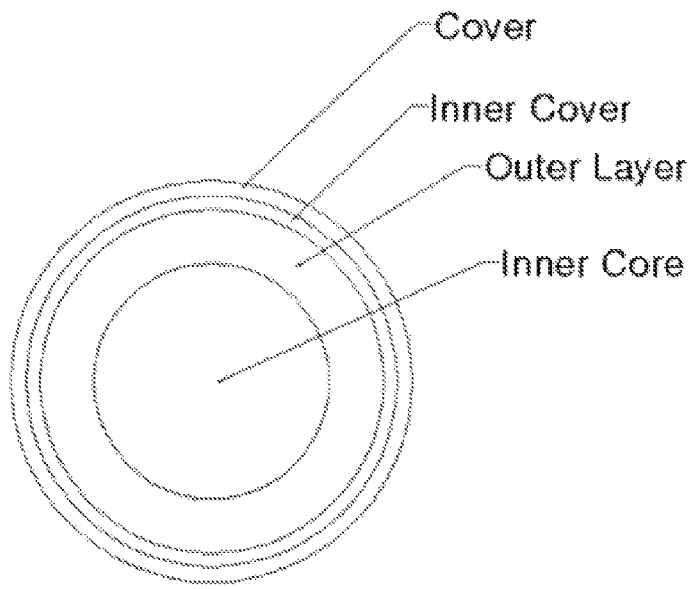
FIG. 3 is a cross-sectional view of a golf ball according to an embodiment of the present invention, which has a four-piece structure having a dual core including an inner core and an outer layer, and a double-layered cover including an inner cover and a cover.

Next, the inner cover may be covered with a cover by using an injection molding machine. A master batch was prepared by mixing Surlyn 8320 (Dupont Co., ionomer of sodium ion), Surlyn 7940 (Dupont Co, ionomer of lithium ion), Surlyn 9910 (Dupont Co., ionomer of zinc ion), Surlyn 9970 (Dupont Co., ionomer of zinc ion), titanium oxide, Irganox 1010 (Ciba Specialty Chemicals Co., phenolic antioxidant), etc. in an amount illustrated in the following Table 2. The master batch was formed into a pellet and dried. The dried cover mixture pellet was molded in a mold equipped with a temperature controlling bath mounted an injection molding machine, on the half-finished product covered with an inner cover to manufacture a cover. A buffing process was performed to buff the mold commissure of the cover, and followed by washing and drying. And then, logo was marked, and a two-component type polyurethane was coated, and drying using hot air, and aging were performed to manufacture a four-piece golf ball having a diameter of about 42.7-42.75 mm, a weight of about 45.3-45.7 g, a dual core, and a double-layered cover, as illustrated in FIG. 3 (Example 2).

Meanwhile, a golf ball compared to Example 2, including a core having the conventional constituents and having the same size and weight as the four piece golf ball having a dual core and a double-layered cover according to Example 2 was manufactured (Comparative Example 2). 24 cores according to Example 2 were tested in a C.O.R. tester manufactured by Automated Design Corporation Co. installed with a barrel #5 at the velocity of 125±2 ft/sec, to measure C.O.R. Similarly, the C.O.R. of 24 dual cores according to Comparative Example 2 was measured. Average values of each result were computed and illustrated at the bottom portion of the following Table 2. Each of the golf balls with covers were installed on the C.O.R. tester with a barrel #3 at the velocity of 125±2 ft/sec, and the results are illustrated at the bottom portion of the following Table 2. In addition, a breaking test was performed with 6 four-piece golf balls individually at the velocity of 175±2 ft/sec and calculated by number until generating crack. The results are illustrated in the following Table 2 for comparison.

TABLE 2

| | | Example 2 | Comparative Example 2 |
|---|---|---|---|
| Mixing ingredient | Inner core composition (parts by weight) | | |
| | Cis-1,4-polybutadiene (Mooney viscosity 40) | 50 | 50 |
| | Cis-1,4-polybutadiene (Mooney viscosity 60) | 50 | 50 |
| | Zinc Diacrylate | 30 | 30 |
| | Zinc oxide | 5 | 5 |
| | Minium | 0 | 0 |
| | 2,2'-methylene-bis(4-methyl-6-tertiarybutylphenol) | 0.5 | 0.5 |
| | N-1,3-dimethylbutyl-N'-phenyl-paraphenylenediamine | 0.7 | 0 |
| | Diphenyl paraphenylenediamine | 0 | 0 |
| | Microcrystalline wax (for curing degree) | 2 | 0 |
| | Bis(t-butylperoxy isopropyl)benzene (40%) | 2.5 | 2 |
| | 1,1'-bis(t-butylperoxy)-3,3,5-trimethyl cyclohexane (40%) | 1 | 1 |
| | Outer layer composition (parts by weight) | | |
| | Cis-1,4-polybutadiene (Mooney viscosity 40) | 50 | 50 |
| | Cis-1,4-polybutadiene (Mooney viscosity 60) | 50 | 50 |
| | Zinc Diacrylate | 29.5 | 29.5 |
| | Zinc oxide | 5.5 | 5.5 |
| | Minium | 16 | 16 |
| | 2,2'-methylene-bis(4-methyl-6-tertiarybutylphenol) | 0.5 | 0.5 |
| | N-1,3-dimethylbutyl-N'-phenyl-paraphenylenediamine | 0.7 | 0 |
| | Diphenyl paraphenylenediamine | 1 | 0 |
| | Microcrystalline wax (for curing degree) | 1.5 | 0 |
| | Bis(t-butylperoxy isopropyl)benzene (40%) | 2.5 | 2 |
| | 1,1'-bis(t-butylperoxy)-3,3,5-trimethyl cyclohexane (40%) | 1 | 1 |
| | Inner cover composition (parts by weight) | | |
| | HPF 2000 | 20 | 20 |
| | Surlyn 8940 | 40 | 40 |
| | Surlyn 9910 | 40 | 40 |
| | Titanium oxide | 3 | 3 |
| | Cover composition (parts by weight) | | |
| | Surlyn 8320 | 25 | 25 |
| | Surlyn 7940 | 10 | 10 |
| | Surlyn 9910 | 60 | 60 |
| | Surlyn 9970 | 5 | 5 |
| | Titanium oxide | 3 | 3 |
| | Irganox 1010 | 0.15 | 0.15 |
| C.O.R. | Test method | | |
| | Core (barrel #5, velocity 125 ± 2 ft/sec) | 0.805 | 0.8046 |
| | Golf ball (barrel #3, velocity 125 ± 2 ft/sec) | 0.8241 | 0.8215 |
| Breaking strength (times) | Golf ball (barrel #3, velocity 175 ± 2 ft/sec) | 89.8 | 50.3 |

As illustrated in the above Tables 1 and 2, the golf ball according to the present invention has good repulsive elasticity as shown from C.O.R., and is not affected by ozone due to static electricity. Therefore, the rubber after cross linking and curing may not be degraded, and a golf ball having good breaking strength is manufactured.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A golf ball comprising a core and a cover covering the core,
wherein the core comprises a base rubber, a co-crosslinking agent, a filler, an antioxidant, a degradation preventing agent, and a cross-linking reaction initiator, and wherein a substituted or unsubstituted paraphenylenediamine derivative represented by following Formula 1 and a microcrystalline wax are used together as the degradation preventing agent:

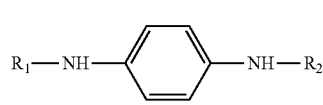

[Formula 1]

where, $R_1$ and $R_2$ each independently represent an alkyl group or an aryl group.

2. The golf ball of claim 1, wherein the base rubber includes about 60 wt % and above of a cis-1,4-polybutadiene rubber based on the base rubber.

3. The golf ball of claim 1, wherein the co-crosslinking agent is an α,β-ethylenically unsaturated carboxylic acid, an ester of the unsaturated carboxylic acid, or a metallic salt of the unsaturated carboxylic acid, or a mixture of the α,β-ethylenically unsaturated carboxylic acid, the ester of the unsaturated carboxylic acid, or the metallic salt of the unsaturated carboxylic acid with an acrylate compound or a methacrylate compound.

4. The golf ball of claim 1, wherein the filler is at least one selected from the group consisting of zinc oxide, magnesium oxide, calcium oxide, lead monoxide, trilead tetraoxide, tungsten oxide, barium sulfate, silica, calcium carbonate, clay, bismuth, tungsten, tin, aluminum, and lead.

5. The golf ball of claim 1, wherein the cross-linking reaction initiator is at least one selected from the group consisting of dicumyl peroxide, N-butyl-4,4'-bis(t-butylperoxy)valerate, bis(t-butylperoxy isopropyl)benzene, 1,1'-bis(t-butylperoxy)-3,3,5-trimethyl cyclohexane, and 2,5-di-(t-butylperoxy)-2,5-dimethylhexane.

6. The golf ball of claim 1, wherein the alkyl group includes 3-9 carbon atoms.

7. The golf ball of claim 1, wherein the aryl group is a phenyl group or a naphthyl group.

8. The golf ball of claim 1, wherein the degradation preventing agent uses two or more kinds of the paraphenylenediamine derivatives.

9. The golf ball of claim 1, wherein the degradation preventing agent is used in an amount of about 0.5-5 parts by weight based on 100 parts by weight of the base rubber.

10. The golf ball of claim 1, wherein the microcrystalline wax is used in an amount of about 0.5-10 parts by weight based on 100 parts by weight of the base rubber.

11. The golf ball of claim 1, wherein the core is any one selected from the group consisting of a single core, a dual core, and a triple core.

12. The golf ball of claim 1, wherein the cover is a multiple-layered cover.

* * * * *